United States Patent [19]
Norcross

[11] Patent Number: 5,106,494
[45] Date of Patent: Apr. 21, 1992

[54] DECANTER ASSEMBLY

[75] Inventor: Kenneth L. Norcross, Kansas City, Mo.

[73] Assignee: JMO Holding, Inc., Industrial Airport, Kans.

[21] Appl. No.: 653,011

[22] Filed: Feb. 8, 1991

[51] Int. Cl.$^5$ ............................................. C02F 1/40
[52] U.S. Cl. ................................ 210/123; 210/221.1; 210/242.3; 210/525
[58] Field of Search .................. 210/221.1, 232, 242.3, 210/522, 525, 123

[56] References Cited

U.S. PATENT DOCUMENTS

| | | | |
|---|---|---|---|
| 1,203,528 | 11/1916 | Brooks | 38/72 |
| 3,333,704 | 8/1967 | McGivern et al. | 210/242 |
| 3,613,889 | 10/1971 | Reed | 210/242 |
| 3,666,102 | 5/1972 | Blanchard | 210/138 |
| 3,757,953 | 9/1973 | Sky-Eagle, Jr. | 210/242 |
| 4,290,887 | 9/1981 | Brown et al. | 210/242.1 |
| 4,431,536 | 2/1984 | Thompson | 210/242.3 X |
| 4,648,967 | 3/1987 | Calltharp et al. | 210/136 |
| 4,695,376 | 9/1987 | Astrom et al. | 210/122 |
| 4,711,716 | 12/1987 | Calltharp et al. | 210/136 |

Primary Examiner—Frank Spear
Attorney, Agent, or Firm—Litman, McMahon & Brown

[57] ABSTRACT

A decanter and support assembly includes a pair of mooring arms pivotally attaching the decanter to a wall of a wastewater reactor basin and hingedly attached to a float buoyantly supporting the decanter. The decanter includes a valve for controlling the draw of liquid thereinto and a flexible discharge conduit that is fixedly attached to the decanter. A control line for powering the valve is mounted at the top of the non-detachable mooring arm. The float supports an actuation device which is operably connected to the control line. In a first embodiment of the decanter valve, the valve is oriented generally vertically at the inlet of the flexible conduit. In a second embodiment of the decanter valve, an actuator mechanism moves an exterior valve hood with a sealing flange which seals the discharge conduit against liquid. The valve hood sleeves a generally cylindrical intake manifold that supports the decanter. In a third embodiment of the decanter valve, a driving plug is utilized to seal against the discharge conduit. A fourth embodiment of the decanter valve includes a valve hood or plug that is located within an intake manifold.

20 Claims, 4 Drawing Sheets

DECANTER ASSEMBLY

BACKGROUND OF THE INVENTION

The present invention relates generally to floating decanters for a wastewater treatment facility and, in particular, to such decanters having mooring arms pivotally connected to a wall of a reactor basin and flexible discharge manifolds equipped with valve mechanisms that seal the discharge manifold against fluid flow from the basin during periods of agitation and mixing of the wastewater.

Certain wastewater treatment processes, especially those utilizing sequencing batch reactor techniques or processes, require that clarified fluid be periodically withdrawn from the reactor or digester within which the process is occurring. Decanters that are utilized to remove the clarified fluid from the reactor are often mounted on a float that buoyantly supports the decanter. A support system is typically included to retain the float an decanter in a particular area and yet allow the decanter and float to move in a vertical direction as the water level in the basin changes.

Some decanter and float support systems include vertical support posts mounted on the basin floor that are slidingly connected by support hardware to the float and decanter. The float and attached decanter slide vertically as the water level changes in the basin. A drawback of such a support system is that the vertical posts are subjected to a torque or twisting force when fluid enters the reactor and when the fluid is mixed therein. This twisting force is transmitted to the decanter and float through the length of the post, thereby intensifying this torque and reducing the life expectancy of the post supports and support hardware. Secondly, such devices require an operator to voyage to the float and decanter for maintenance or retrieval. This may be dangerous, as well as inconvenient. Finally, a decanting apparatus moored on posts in a central portion of a basin requires additional floats for buoyantly supporting a line that provides power to an actuator for opening and closing the decanter. The power line is exposed to the corrosive waste or liquid within the tank which not only causes difficulty in cleaning, but may reduce the life expectancy of the line.

Other decanter and float support systems include a rigid support structure that surrounds a flexible discharge conduit connected to the decanter. Such a support structure is mounted on a wall of the basin and includes sections that hinge so that the conduit may pivot or flex as the water level in the basin increases or decreases. A drawback of such a support system is that an operator must also make the inconvenient and sometimes dangerous voyage to the float and decanter for maintenance or retrieval. If it is desired to utilize a decanter having a power-actuated valve for drawing in liquid, such a support system may not provide the rigidity necessary to keep the decanter in place during the turbulent mixing cycle of a reactor. Such a support system may also require additional floats for buoyantly supporting a power line if a power actuator is used. In the alternative, such a power line may be attached to the support system and flexible conduit. However, the support system and conduit are below the fluid level, therefore both the system and power line may be awkward and troublesome to maintain.

SUMMARY OF THE INVENTION

The present invention is a decanter and support assembly that includes a pair of mooring arms located near the liquid in a wastewater reactor basin and pivotally connected to a basin wall at one end thereof and hingedly connected to a float assembly at the other end thereof. The float assembly buoyantly supports a liquid decanter having a valve that is electrically, pneumatically, hydraulically or similarly actuated for drawing liquid into the decanter and through a flexible conduit that is flow connected to a rigid discharge pipe that extends through a wall of the reactor basin. The mooring arms generally hold the float and decanter in a central position in the reactor basin and pivot with respect to the vertical when the liquid level changes within the basin.

Features of the mooring arms include a removable pin on a first of the arms at the location where the arm pivotally connects to the basin wall. The second arm includes a universal joint at the location where the second arm is pivotally connected to the basin wall. An operator may therefore retrieve or perform maintenance on the float and decanter unit by removing the pin on the first mooring arm, thereby disconnecting the arm from the wall, and pulling the unit to a side of the basin. The second arm having the universal joint also has an actuator control line mounted thereupon that is connected to the actuator of the decanter valve. The line is mounted on the top surface of the mooring arm and is therefore not suspended in the mixed liquor in the reactor basin and does not require additional, separate floats.

The float-supported decanter houses an actuation device or valve which alternately seals and opens the entrance to the flexible discharge conduit. This flexible conduit easily bends and allows for vertical travel of the float and decanter as the basin liquid level varies In one II embodiment of a decanter according to the present invention, the decanter valve is attached directly to an inlet portion of the conduit. The valve is actuated by a mechanism located at the top of the float assembly. The actuating force is transmitted to the valve through a generally vertical shaft extending between the actuation mechanism and the valve.

In a second embodiment of a decanter according to the present invention, an actuator mechanism is attached to an exterior valve hood with a sealing flange that mates with a discharge flange that is fixedly attached to the flexible discharge conduit. The actuator mechanism is adapted to force the hood into a position against the sealing flange, covering the discharge conduit and thereby sealing the conduit from liquid in the basin. The actuator mechanism may be retracted to a position spaced from the discharge flange to allow flow of liquid into the discharge conduit. The exterior valve hood is held in position and guided by an intake manifold that is fixedly attached to the support housing of the discharge flange. A gasket is positioned circumferentially about the valve hood and is fixedly attached to a pipe sleeve assembly that seals the actuator mechanism from material within the reactor basin.

In a third embodiment of a decanter according to the present invention, the exterior valve hood of the second embodiment is replaced by a solid sealing flange fixedly attached to a drive hood that is attached to an actuator mechanism and is adapted to seal against the discharge flange. The actuator mechanism may be retracted to a position spaced from the discharge flange to allow flow of liquid into the discharge conduit.

In a fourth embodiment of a decanter according to the present invention, a sealing hood is utilized similar to the exterior valve hood of the second embodiment with the exception that the hood is sleeved by the intake manifold and support housing.

OBJECTS AND ADVANTAGES OF THE INVENTION

Therefore, the objects of the present invention are: to provide a decanter assembly for use in conjunction with a wastewater treatment facility which may be easily retrieved for maintenance and replacement; to provide such an assembly that includes mooring arms pivotally connected to both a reactor basin wall and to the decanter that maintain the decanter in a central position in the basin during usage; to provide such an assembly wherein one mooring arm may be disconnected from the basin wall, thereby allowing an operator to pivot the decanter assembly toward the basin wall and easily access the decanter for maintenance; to provide such an assembly which is articulated with respect to the reactor basin and freely moves vertically to compensate for change in the liquid level within the basin; to provide a decanter assembly having a clarified fluid receiver co-operating with a conduit to selectively discharge fluid from the reactor basin; to provide such a decanter assembly that is highly effective in preventing sludge or scum from being drawn into and settling within the fluid receiver; to provide such a decanter assembly that includes an actuator mechanism for opening and closing the fluid receiver; to provide such a decanter assembly that includes a conduit or passage for a line providing power to the actuator that is protected from corrosive liquid in the reactor basin; to provide such a decanter assembly wherein the power line is mounted on a mooring arm; to provide such a decanter assembly that is relatively easy to use, inexpensive to construct, easy to install, has a relatively long life expectancy and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a decanter assembly of the present invention including first and second mooring arms 5 and 6, a float 8, valve means such as illustrated decanter valve assembly generally designated by the reference numeral 12, and a flexible discharge conduit 15 located in a wastewater treatment reactor basin 18.

Figure 1:
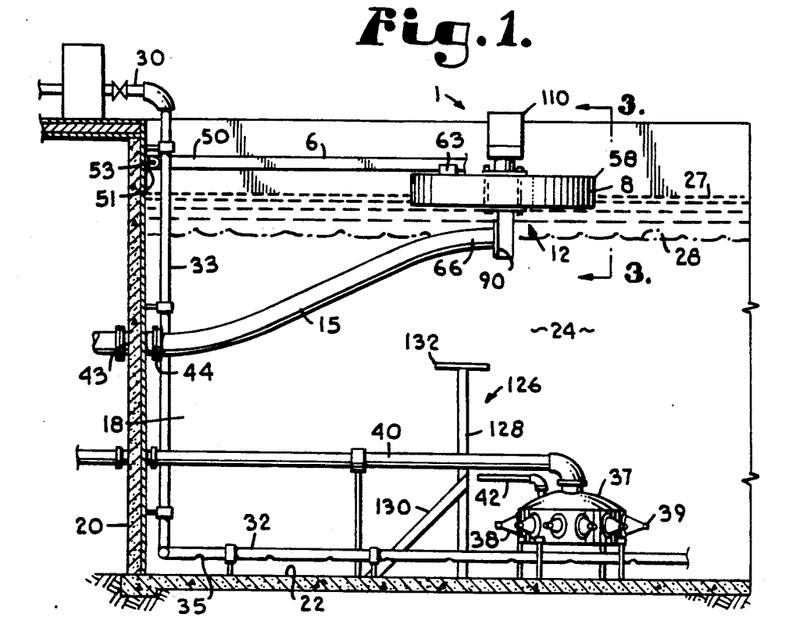
FIG. 1 is a partially schematic, cross-sectional view of a wastewater treatment facility having a decanting assembly according to the present invention including a mooring arm, a float, a decanter and a flexible discharge conduit.

The basin 18 has a side wall 20 and a floor 22 and holds wastewater fluid 24 being treated therein. The fluid 24 has a cyclic level which has a normal high mark, generally indicated by the reference numeral 27, and a normal low level mark, indicated by the reference numeral 28. Wastewater to be treated enters through filling means such as a manifold 30 and is distributed along the bottom of the basin 18 by means of a trident-shaped distribution conduit 32 flow connecting with the manifold 30 by a downcomer 33 and having a plurality of distribution apertures 35 therealong. The distribution conduit 32 also flow connects with a pump (not shown) which in turn flow connects with the apertures 35 which distribute flow from the pump into a distribution structure 37.

The distribution structure 37 has an internal chamber connecting with a plurality of distribution nozzles 38. The nozzles 38 are conical-shaped and have discharge openings 39 therein. Piping, including a line 40 and valving (not shown), of the pump may draw from the distribution conduit 32 and discharge through the line 40 and the nozzles 38 or draw through the nozzle openings 39 and discharge though the distribution conduit apertures 35 for cleaning of the nozzles 38, as desired. The piping associated with the pump may also be aligned as sludge removal means to discharge sludge drawn from the conduit 32 to a sludge collection point (not shown), so that sludge may be withdrawn from the basin 18.

A pressurized air manifold 42 is connected to a compressed air source (not shown) such as an air compressor. In this manner, compressed air can be selectively mixed with the wastewater fluid in the distribution structure 37 such that the wastewater exiting the nozzles 38 is highly oxygenated.

The decanter assembly 1 operates to remove clarified liquid (that is, water having been treated in the reactor basin 18 and from which sludge has been allowed to settle) from the wastewater reactor basin 18. Such an assembly 1 may be utilized in any application where a decanter is desired, such as digesters or equalization basins. The clarified liquid flows into the discharge conduit 15, through a discharge pipe 43 flow connected to the conduit 15, that extends through the wall 20 of the basin 18. A flanged joint 44 fixedly attaches the discharge conduit 15 to the discharge pipe 43.

Figure 2:
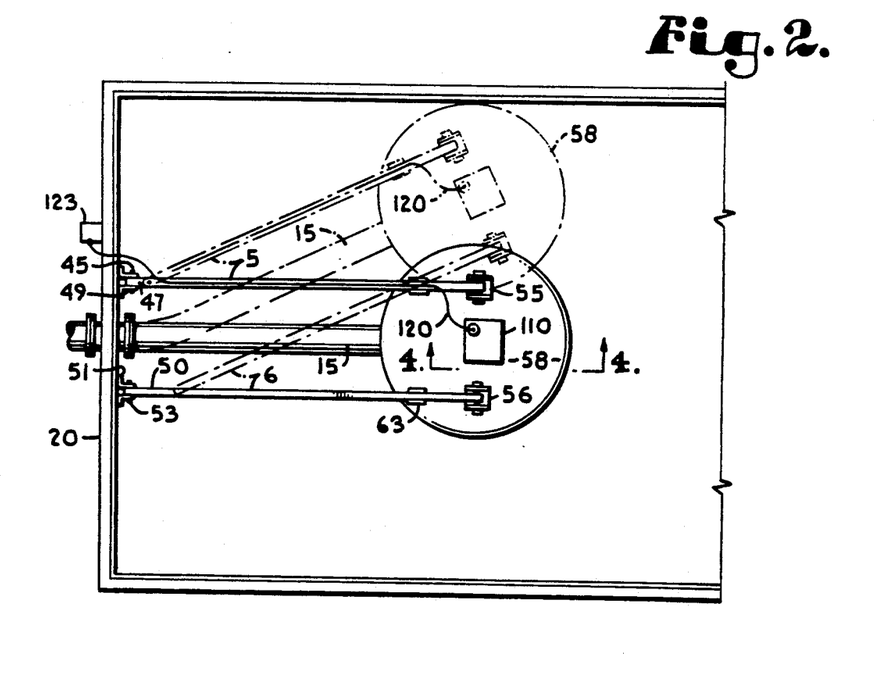
FIG. 2 is a top plan view of the decanting assembly.

The decanter assembly 1 includes mooring means, as illustrated by the generally parallel, spaced, mooring arms 5 and 6. The mooring arm 5 includes a universal joint 45 that is located near an end 47 thereof proximal to the wall 20 of the reactor basin 18. A bracket 49 is fixedly attached to the side wall 20 and pivotally attached to the universal joint 45. The bracket 49 is located above the high level mark 27.

The mooring arm 6 includes an end 50 that is hingedly attached to a hinge bracket 51 that is fixedly attached to the side wall 20 at the same distance above the high level mark 27 as the bracket 49. The hinge bracket 51 is adapted to allow vertical movement of the mooring arm 6. The hinge bracket 51 includes a removable pin 53 that, when removed, detaches the mooring arm 6 from the bracket 51 and the wall 20.

Both mooring arms 5 and 6 are pivotally attached to hinge brackets 55 and 56 respectively that are both fixedly attached to a top surface 58 of the circular float 8. The hinge brackets 55 and 56 are generally equidistant from a circumference 60 of the top surface 58 of the float 8. By being pivotally connected to both the side wall 20 and the float 8, the mooring arms 5 and 6 pivot with respect to the vertical when the liquid level changes within the basin 18.

The mooring arms 5 and 6 also generally retain the float 8 and decanter valve assembly 12 in a central position in the reactor basin 18. A mooring arm support 63 that is fixedly attached to the float 8 cradles the arm 6 when the arm 6 is disconnected from the wall 20, preventing any lateral pivoting by the arm 6 about the hinge 56 or damage to the float 8 and also retains the arm 6 in a generally horizontal position.

Figure 3:
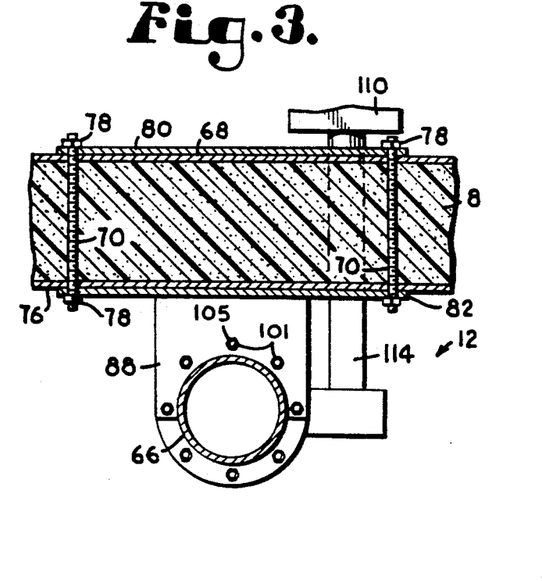
FIG. 3 is an enlarged and fragmentary, cross-sectional view of the float and the decanter of the decanter assembly, taken along 3—3 of FIG. 1.
Figure 4:
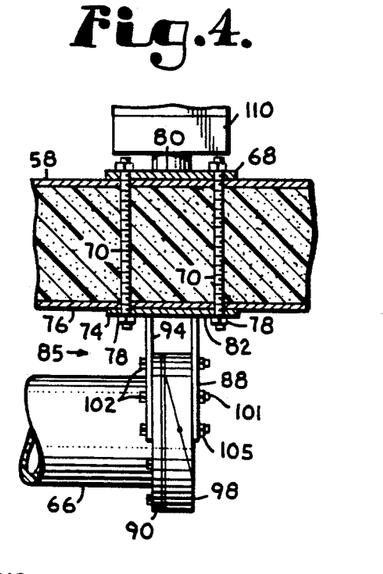
FIG. 4 is an enlarged and fragmentary, cross-sectional view of the float, the decanter and the discharge conduit of the decanting assembly, taken along 4—4 of FIG. 2.

The float 8 buoyantly supports the decanter valve assembly 12, maintaining the flexible discharge conduit 15 beneath the surface of the liquid 24 in the basin 18 with an upper portion 66 of the conduit 15 held slightly below the surface of the liquid 24. The float 8 includes a cylindrical shell, preferably made from fiberglass or from stainless steel, that is filled with foam or other buoyant material.

In order to support the decanter valve assembly 12, a generally rectangular, top mounting plate 68 rests adjacent to the top surface 58 of the float 8 and is fixedly attached by four long, headless, threaded bolts 70 that extend through the foam and through a generally rectangular, bottom mounting plate 74 that is adjacent to a bottom surface 76 of the float 8. The bolts 70 extend through apertures (not shown) located in the similarly-shaped plates 68 and 74 near each of the four corners thereof. The bolts 70 are positioned generally perpendicular to both the plate 68 and the plate 74. The nuts 78 mate with the bolts 70 near a top surface 80 of the mounting plate 68 and a bottom surface 82 of the mounting plate 74 and thereby secure the plates 68 and 74 to the float 8 by application of torque with the nuts 78 abutting against the surfaces 80 and 82.

A generally vertically-oriented discharge conduit support bracket 85 is welded or otherwise fixedly attached to the bottom mounting plate 74. The support bracket 85 includes two parallel, identically-shaped plate sections 87 and 88. The plate sections 87 and 88 are generally perpendicular to the plate 74 and extend generally downward therefrom. The plate sections 87 and 88 are shaped and adapted to form a half-circle about the upper portion 66 of the discharge conduit 15.

An annular flange 90 fixedly attached to an end 92 of the discharge conduit 15 abuts an inner surface 94 of the plate section 87. A valve apparatus 98 is generally vertically oriented between the flange 90 and the plate section 88 and is fixedly attached to the flange 90. Bolts 101 having heads 102 extend through the flange 90 and the plates 87 and 88, with the heads 102 abutting against an outer surface of the plate 87 and are secured by nuts 105 against an outer surface of the plate 88, retaining the flange 90 and the valve apparatus 98 in position between the plate sections 87 and 88.

The valve apparatus 98 is a positive-sealing type of valve, such as a pinch or plug valve, operated electrically, pneumatically or by other conventional methods of imparting a driving force to a valve. The valve apparatus 98 is actuated by a mechanism generally illustrated by the reference numeral 110. The actuator mechanism 110 is fixedly mounted to the top plate 68 and is fixedly attached and flow connected to a generally L-shaped actuator shaft housing 114 that extends through the center of the float 8 and downwardly toward the discharge conduit 15 and is flow connected to the valve apparatus 98. The actuating force to open and close the valve apparatus 98 is transmitted from the actuator mechanism 110, through the actuator shaft housing 114 to the valve apparatus 98.

A control line 120 for electrically or pneumatically powering the actuation mechanism 110 is mounted on the top surface of the mooring arm 5 and extends from a power source located outside the reactor basin 18, represented by the reference numeral 123, to the actuation mechanism 110 located on the float 8. By being mounted on the mooring arm 5, the control line 120 is not immersed in the liquid 24 in the basin 18, extending the life expectancy thereof.

A support structure 126 is fixedly attached to the floor 22 of the reactor basin 18 and extends vertically approximately one-fourth to one-half the height of side wall 20. The structure includes a vertical member 128 bolted or otherwise fixedly attached to the floor 22, an inclined support brace 130 fixedly attached to the floor 22 and to the vertical member 128, and a horizontal platform 132 fixedly attached to the vertical member 128 and perpendicular thereto. If the liquid 24 in the basin 18 is drained to a level even with or below the platform 132, the valve assembly 12 is adapted to rest upon the platform 132, thereby prohibiting the assembly 12 from resting in sludge (not shown) that may be located near the floor 22 of the basin 18.

In use, the wastewater batch reactor basin 18 is typically partially prefilled with fluid to the low water level 28. This fluid generally is fluid remaining from a previous usage of the basin 18 and includes a substantial amount of activated sludge (not shown) in a layer settled on the bottom of the basin 18. Additional wastewater to be treated is added to the reactor basin 18 to bring the fluid level up to the high water level 27. Thereafter, the fluid is agitated and/or aerated in accordance with the desired sequential batch reactor treatment selected for such wastewater, after which all agitation of the liquid is stopped, so that the sludge therein may again settle to the bottom. During agitation, microorganisms in the sludge modify biological wastes in the reactor so as to effectively remove the waste from the water. After settling, a clarified liquid layer at the top of the reactor remains and extends at least between the low water level 28 and the high water level 27, but normally also extends well below the low water level 28. During the agitation and settling steps, the valve apparatus 98 is closed, thereby operably preventing liquid 24 inside the basin 18 from entering into the discharge conduit 15. The vertical orientation of the valve apparatus 98 greatly reduces the ability of sludge to settle on or near the valve 98 during the settle stage and to later be drawn out of the basin 18 with the clarified effluent.

When it is desired to remove the clarified liquid layer, the valve apparatus 98 is opened by action of the actuation mechanism 110. Clarified fluid then flows through the valve apparatus 98 and through the discharge conduit 15 and discharge pipe 43 and out of the reactor basin. As the fluid level lowers, the decanter assembly 1 descends as the float 8 descends, with the mooring arms 5 and 6 pivoting about the universal joint 45 and the hinge 51 respectively. The valve apparatus 98 is selectively maintained open by an operator, computer control or the like, until the clarified fluid is drained to the low water level 28, after which the valve 98 is shut.

When an operator desires to perform maintenance on or remove the valve assembly 12 from the basin 18, the pin 53 is removed from the bracket 51, disconnecting the mooring arm 6 from the wall 20. The operator may then pivot the arm 5, float 8 and attached decanter valve assembly 12 with respect to the horizontal, as is shown in FIG. 2, until the float 8 and assembly 12 are adjacent to the wall 20 and within reach of the operator standing beside the basin 18.

Figure 5:
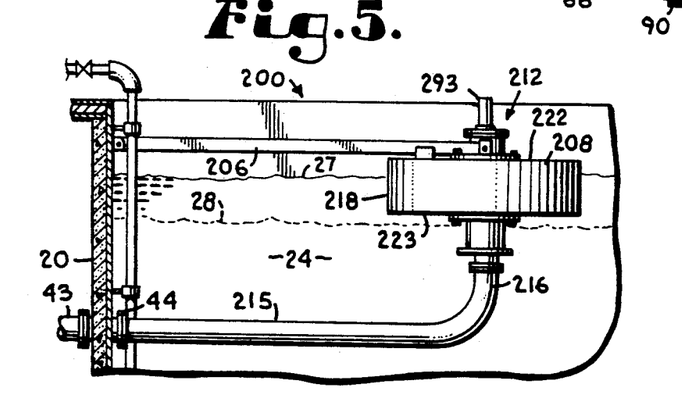
FIG. 5 is a partially schematic, cross-sectional view of a first modified wastewater treatment facility having a first modified decanting assembly according to the present invention including a mooring arm, a float, a second embodiment of a decanter and a discharge flange and conduit.
Figure 6:
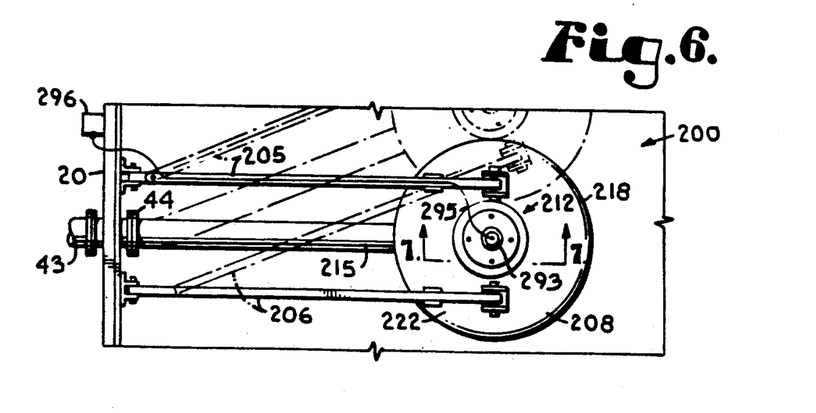
FIG. 6 is a top plan view of the first modified decanting assembly.
Figure 7:
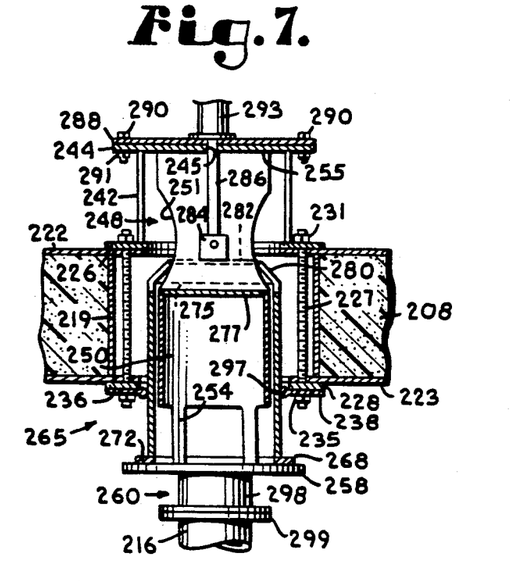
FIG. 7 is an enlarged and FIG. 7a a fragmentary, cross-sectional view of the float the decanter and the discharge flange the first modified decanting assembly, taken along 7—7 of FIG. 6.
Figure 7A:
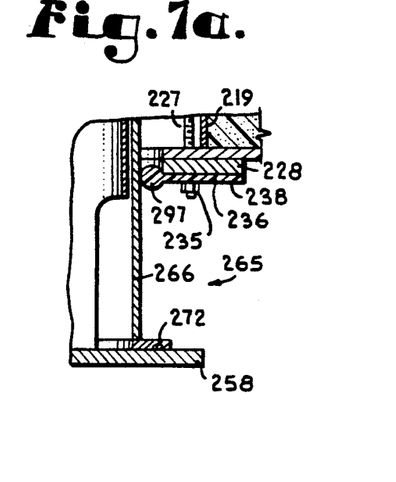

A second embodiment of a decanter assembly according to the present invention, generally designated by the reference numeral 200, is illustrated in FIGS. 5, 6 and 7. The assembly 200 may also be located within a reactor basin of the same type described for the reactor basin 18 and utilized with the distribution conduit 32, the distribution structure 37, the air manifold 42 and the support structure 126 described with respect to the previous embodiment. The second embodiment assembly 200 includes a pair of hinged or pivotal mooring arms 205 and 206, a float 208, valve means such as a decanter valve assembly, generally designated by the reference numeral 212, and a flexible discharge conduit 215 located in the wastewater treatment reactor basin 18. With the exception of the valve assembly 212, the attachment of discharge conduit 215 to the assembly 212, and the configuration of the float 208, the second embodiment decanter assembly 200 is identical to the first embodiment decanter assembly 1. The mooring arms 205 and 206 furthermore function identically to the mooring arms 5 and 6 of decanter assembly 1.

The float 208 buoyantly supports the decanter valve assembly 212, maintaining the flexible discharge conduit 215 beneath the surface of the liquid 24 in the basin 18 with an upper portion 216 of the conduit 215 held slightly below the surface of the liquid 24. The float 208 includes a cylindrical sleeve preferably made from fiberglass or stainless steel and having an outer cylindrical wall 218 and an inner cylindrical wall 219, a top surface 222 and a bottom surface 223, and being foam-filled within the outer wall 218, the inner wall 219 and the top and bottom surfaces 222 and 223.

In order to support the decanter valve assembly 212, a generally flat, ring-shaped or annular, top mounting plate 226 rests adjacent to the top surface 222 of the float 208 and is fixedly attached by a plurality of long, headless, threaded bolts 227 that extend generally downwardly and through a generally flat, ring-shaped or annular, bottom mounting plate 228 that is adjacent to the bottom surface 223 of the float 208. The bolts 227 extend through apertures (not shown) located in the similarly-shaped plates 226 and 228 and are located near the wall 219 of the float 208. The bolts 227 are positioned generally perpendicular to both the plate 226 and the plate 228.

A plurality of nuts 231 mate with the bolts 227 near a top surface 232 of the mounting plate 226. A plurality of nuts 235 mate with the bolts 227 near a bottom surface 236 of the mounting plate 228 and thereby secure the plates 226 and 228 to the float 208 by application of torque with the nuts 231 abutting against surface 232 and with the nuts 235 abutting against a gasket member 238, to be described further in a following paragraph. The gasket member 238 is sandwiched between the nuts 235 and the bottom surface 236 of the mounting plate 228 and thereby held in place therebetween by friction.

An upper pipe-sleeve support 242 is welded or otherwise fixedly attached to the top mounting plate 226 and extends upwardly therefrom. A generally flat, circular cap plate 244 having a central aperture 245 is welded or otherwise fixedly attached to the upper pipe-sleeve support 242.

A generally vertically-oriented, two-piece intake manifold structure 248 includes a first curved or semi-cylindrical sleeve portion 250 having a generally concave or hyperbolic mid-section 251 that is spaced from the plate 226, and a rectangular intake orifice 252 at a lower portion 254 thereof The first sleeve portion 250 is fixedly attached to the cap plate 244 at an upper end 255 thereof and is located within the upper pipe-sleeve support 242 and the inner cylindrical wall 219 of the flat 208. The lower portion 254 of the first sleeve portion 250 extends below the bottom mounting plate 228 and is fixedly attached to a bottom mounting or receiving flange 258 of a discharge flange spool assembly 260 that is fixedly attached to the upper portion 216 of the discharge conduit 215.

The intake manifold structure 248 also includes a second sleeve portion (not shown) that is identical to the first sleeve portion 250, is fixedly attached to both the cap plate 244 and the bottom mounting flange 258 and positioned oppositely from the first sleeve portion 250. The two sleeve portions of the intake manifold structure 248 are spaced, but form a generally cylindrically-shaped inner support for the valve assembly 212 because both portions of the intake manifold structure 248 are fixedly attached to both the cap plate 244 and the discharge flange spool assembly 260.

Alternately, the intake manifold structure 248 may be made from a generally cylindrical sleeve fixedly attached to both the cap plate 244 and the bottom mounting flange 258, and having a hyperboloid mid-section with segments cut out to provide clearance for a driving valve apparatus, such as an exterior valve hood assembly 265 described in the next paragraph, and a lower portion with segments cut out to create an intake orifice.

The intake manifold structure 248 is slidingly sleeved by an exterior valve hood 266 that is included in the exterior valve hood assembly 265 identified above. The exterior valve hood 266 is a cylindrical sleeve that has a sealing flange 268 fixedly attached to the base 269 thereof. A circular sealing gasket 272 is fixedly attached to the bottom surface of the sealing flange and abuts a top surface of the bottom mounting flange 258 of the discharge flange spool assembly 260 when the valve hood assembly 265 is in a first or closed position, as is shown in FIG. 7.

When the valve hood assembly 265 is in a closed position, an upper edge or circumference 275 of the exterior valve hood 266 is located slightly above a horizontal position 277 where the first and second sleeve portions of the intake manifold structure 248 curve inwardly to form the concave mid-section 251 thereof. A pair of support brackets 280 are fixedly attached to the upper edge 275 of the valve hood 266 and are located between the first and second sleeve portions of the intake manifold structure 248. The support brackets 280 slant inwardly and each are fixedly attached to an actuator support plate 282. The actuator support plate 282 is generally flat and circular in shape and has a diameter of a length sufficiently small to allow the plate 282 to raise within the curved mid-section 251 of the first and second sleeve portions of the intake manifold structure 248 and not abut thereagainst.

Fixedly mounted on the top surface of the actuator support plate 282 is an actuator mounting bracket 284 that is fixedly attached to an actuator stem 286. The actuator stem extends through the aperture 245 in the cap plate 244 and further extends through an aperture is a flat, circular top plate 288 that is adjacent to the cap plate 244 and fixedly attached thereto by bolts 290 and mating nuts 291 that are located near a periphery of both plates 244 and 288 with the bolts 290 extending through both the plates 244 and 288. An actuator mechanism 293 is fixedly mounted on the top plate 288 with the actuator stem 286 extending thereinto. The stem 286 is operatively connected with the actuator mechanism 293. The stem 286 is forced downwardly by hydraulic or pneumatic forces from the actuator mechanism 293 to maintain the exterior valve hood 266 in a closed position abutting the bottom mounting flange 258.

A control line 295 conveying power-generating means for hydraulically or pneumatically powering the actuator mechanism 293 is mounted on the top surface of the mooring arm 205 and extends from a power source located outside the reactor basin 18 represented by the reference numeral 296 to the actuator mechanism 293 located on the float 208. By being mounted on the mooring arm 205, the control line 295 is not immersed in the liquid 24 in the basin 18, extending the life expectancy thereof.

The valve hood assembly 265 which includes the exterior valve hood 266, the support brackets 280, the actuator support plate 282, and the actuator stem 286 is guided and held in position by the intake manifold structure 248. The gasket member 238 that is sandwiched between the bottom mounting plate 228 and the nuts 235 includes a cylindrical inner rib 297 that slidingly abuts against the outer surface of the exterior valve hood 266, sealing an upper portion of the valve hood 266, the support brackets 280, the actuator support plate 282, and the actuator stem 286 from liquid 24 in the basin 18.

The discharge flange spool assembly 260 that includes the bottom mounting flange 258 also includes a rigid pipe portion 298 fixedly attached to the flange 258 and a conduit flange 299 fixedly attached to the other end of the pipe portion 298. The conduit flange 299 is fixedly attached to the flexible discharge conduit 215.

In use of the decanter assembly 200, the wastewater reactor basin 18 is filled with liquid 24, with the liquid being agitated and/or aerated as described above with respect to decanter assembly 1 of the first embodiment. During the agitation, aeration and settling steps, the valve assembly 212 is in a first, closed position, with the actuator stem 286 extended, forcing the exterior valve hood 266 to abut against the bottom mounting flange 258, sandwiching the sealing gasket 272 therebetween.

When it is desired to withdraw the clarified liquid layer from the basin 18, the exterior valve hood 266 is placed in a raised or second position by action of the actuation mechanism 293, as is shown in FIG. 5. Pressure is relieved from the mechanism 293 and the actuator stem 286 automatically raises and enters into the mechanism 293, raising the attached valve hood 266. Clarified fluid then flows through the intake orifices 252 and the spaces between the first sleeve portion 250 and a second sleeve portion of the intake manifold structure 248. Clarified fluid then flows through the annular, bottom mounting flange 258 and the discharge flange spool assembly 260 and into the discharge conduit 215. As the fluid level lowers, the decanter assembly 200 descends as the float 208 descends, with the mooring arms 205 and 206 swinging or pivoting in a downward direction. The valve apparatus 212 is selectively maintained open by an operator, computer control or the like, until the clarified fluid is drained to the low water level 28, after which the exterior valvehood 266 is lowered and seated against the bottom mounting flange 258, as is shown in FIG. 6.

Figures 8, 9:
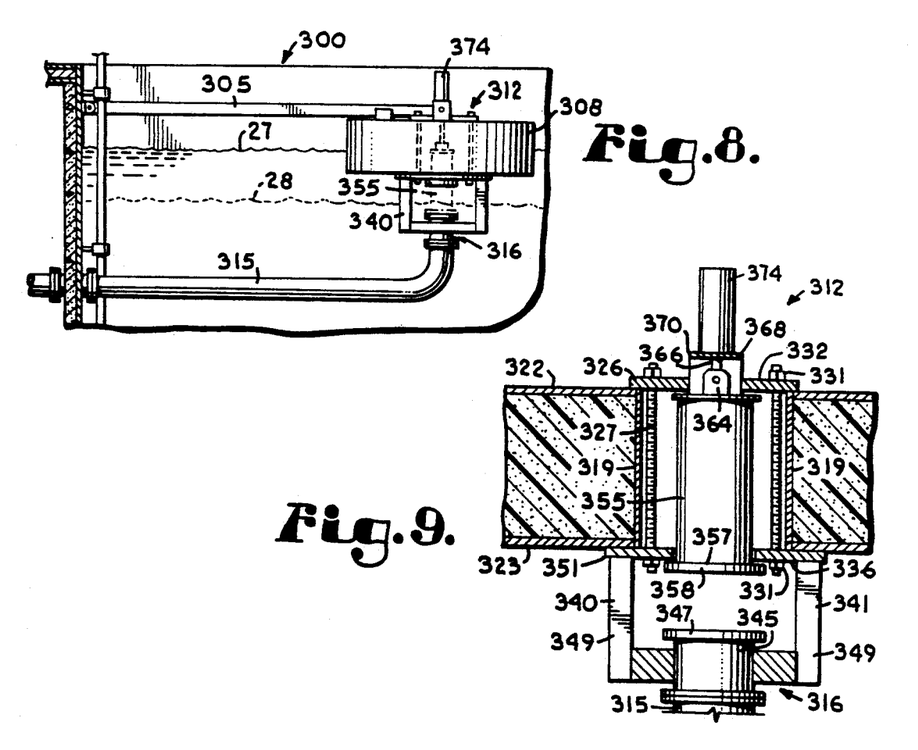
FIG. 8 is a partially schematic, cross-sectional view of a second modified wastewater treatment facility having a second modified decanting assembly according to the present invention including a mooring arm, a float, a third embodiment of a decanter and a discharge flange and conduit.
FIG. 9 is an enlarged and fragmentary, cross-sectional view of the float, the decanter and the discharge flange of the second modified decanting assembly.

A third embodiment of a decanter assembly according to the present invention, generally designated by the reference numeral 300, is illustrated at FIGS. 8 and 9. The assembly 300 may also be located within the reactor basin 18 and utilized with the distribution conduit 32, the distribution structure 37, the air manifold 42 and the support structure 126. The third decanter assembly 300 includes a pair of hinged or pivotal mooring arms 305 generally identical to the arms 205 and 206 of the second embodiment 200, a float 308 generally identical to the float 208 of the second embodiment 200, valve means such as a decanter valve assembly generally designated by the reference numeral 312 and a flexible discharge conduit 315 fixedly attached to a discharge flange spool assembly 316 and being generally identical to the discharge flange spool assembly 260 of the second embodiment 200 and being located in the wastewater treatment reactor basin 18. With the exception of the valve assembly 312, the third embodiment decanter assembly 300 is substantially identical to the second embodiment decanter assembly 200.

The float 308 buoyantly supports the decanter valve assembly 312, maintaining the flexible discharge conduit 315 beneath the surface of the liquid 24 in the basin 18 with the discharge flange spool assembly 216 held slightly below the surface of the liquid 24. The foam-filled float 308 includes an inner cylindrical wall 319, a top surface 322 and a bottom surface 323. In order to support the decanter valve assembly 312, a generally flat, ring-shaped or annular, top mounting plate 326 rests adjacent to the top surface 322 of the float 308 and is fixedly attached by a plurality of long, headless, threaded bolts 327 that extend generally downwardly and through a generally flat, ring-shaped or annular, bottom mounting plate 328 that is adjacent to the bottom surface 323 of the float 308 and has an outer diameter greater than the outer diameter of the top plate 326. The bolts 327 extend through apertures (not shown) located in the plates 326 and 328 and are located near the wall 319 of the float 308. The bolts 327 are positioned generally perpendicular to both the plate 326 and the plate 328.

A plurality of nuts 331 mate with the bolts 227 near a top surface 332 of the mounting plate 326 and near a bottom surface 336 of the mounting plate 328 and thereby secure the plates 326 and 328 to the float 308 by application of torque with the nuts 331 abutting against surface 332 and against surface 336.

A pair of generally L-shaped brackets 340 and 341 are each welded or otherwise fixedly attached to the bottom surface 336 of the bottom mounting plate 328 and are also each welded or otherwise fixedly attached to a cylindrical rigid pipe portion 345 of the discharge flange spool assembly 316. The brackets 340 and 341 are located oppositely and are adapted to place the bottom plate 328 in spaced relation to a receiving flange 347 of the discharge flange spool assembly 316. The generally vertical portions 349 of the brackets 340 and 341 extend downwardly from the plate 328 at a location near an outer circumference 351 thereof.

A generally solid, cylindrical driving valve apparatus or driving plug 355 is housed within the wall 319 of the float 308. Fixedly attached to a base 357 of the plug 55 is a sealing flange 358 that is adapted to mate with the receiving flange 347 when the decanter valve assembly 312 is in a first or closed position, as is shown in FIG. 8.

Fixedly mounted to a top surface 360 of the driving plug 355 is an actuator mounting bracket 364 that is fixedly attached to an actuator stem 366. The actuator stem 366 extends through a central aperture in a cap plate 368 that is fixedly mounted to a cylindrical top support sleeve 370 that is fixedly mounted to the top plate 326. The actuator stem 366 further extends into an actuator mechanism 374 that is fixedly mounted on cap plate 368. The stem 366 is operatively connected to the mechanism 374 and is forced downwardly by hydraulic or pneumatic forces from the actuator mechanism 374 to maintain the driving plug 355 in a closed position with the flange 358 abutting the bottom receiving flange 347.

A control line (not shown) for hydraulically or pneumatically powering the actuator mechanism 374 is mounted on the top surface of the mooring arm 305 and extends from a power source located outside the reactor basin 18 to the actuator mechanism 374 located on the float 308. The control line is situated and functions identically to the control line 295 described above with respect to the second embodiment 200.

The driving plug 355 and the actuator stem 366 are guided and held in position by an inner wall 378 of the bottom mounting plate 328. A gasket member (not shown) similar to the gasket member 238 of the second embodiment 200 may be fixedly attached to bottom plate 328 and be adapted to slidingly abut against the outer surface of the driving plug 355, sealing the actuator stem 366 from liquid 24 in the basin 18.

In use of the decanter assembly 300 the wastewater reactor basin 18 is filled with liquid 24, with the liquid being agitated and/or aerated as described above with respect to the decanter assembly 1 of the first embodiment. During the agitation, aeration and settling steps, the valve assembly 312 is in a first or closed position with the actuator stem 366 extended, forcing the sealing flange 358 to abut against the bottom receiving flange 347.

When it is desired to remove the clarified liquid layer from the basin 18, the driving plug 355 is raised to a second or open position by action of the actuation mechanism 374, as is shown in FIG. 9. Pressure is relieved from the mechanism 374 and the actuator stem 366 automatically raises and enters into the mechanism 374, raising the attached plug 355. A top surface of the sealing flange 358 abuts against the bottom surface 336 of the bottom mounting plate 328 when the valve assembly 312 is fully opened. Clarified fluid then flows through the annular, bottom mounting flange 347 and the discharge flange spool assembly 316 and into the discharge conduit 315. As the fluid level lowers, the decanter assembly 300 descends as the float 308 descends, with the mooring arms 305 swinging or pivoting in a downward direction. The valve apparatus 312 is selectively maintained open by an operator, computer control or the like, until the clarified fluid is withdrawn down to the low water level 28, after which the driving plug 355 is lowered with the flange 358 seated against the bottom receiving flange 347, as is shown in FIG. 8.

Figure 10:
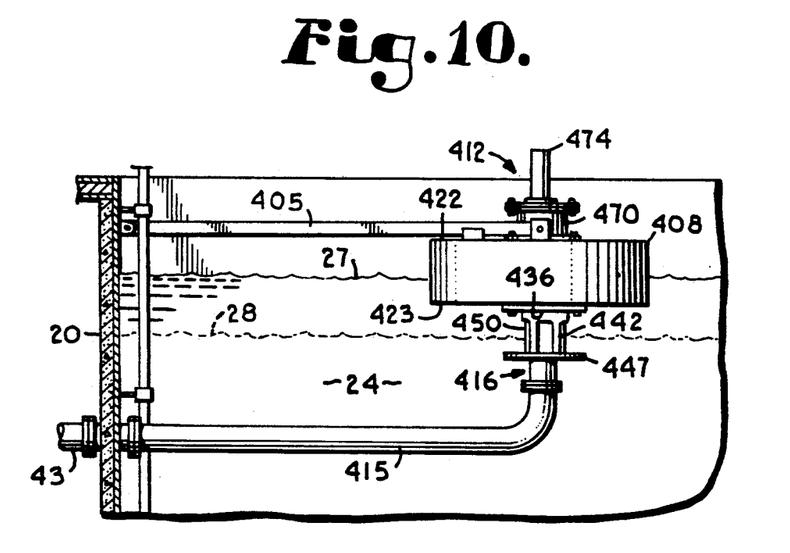
FIG. 10 is a partially schematic, cross-sectional view of a third modified wastewater treatment facility having a third modified decanting assembly according to the present invention including a mooring arm, a float, a fourth embodiment of a decanter and a discharge flange and conduit.
Figure 11:
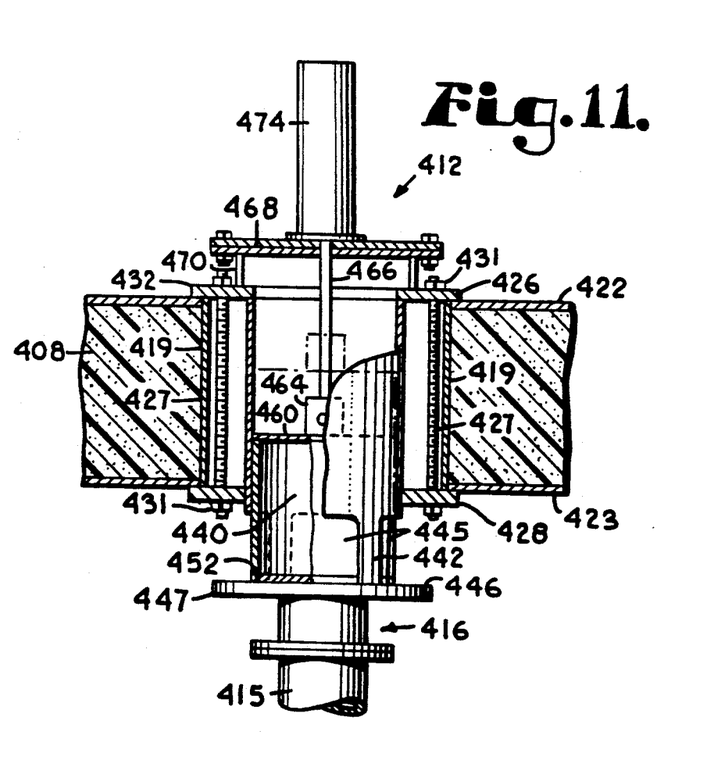
FIG. 11 is an enlarged and fragmentary, cross-sectional view of the float, the decanter and the discharge flange of the third modified decanting assembly.

A fourth embodiment of a decanter assembly according to the present invention, generally designated by the reference numeral 400, is illustrated in FIGS. 10 and 11. The assembly 400 may also be located within the reactor basin 18 and utilized with the distribution conduit 32, the distribution structure 37, the air manifold 42 and the support structure 126. The fourth embodiment decanter assembly 400 includes a pair of hinged or pivotal mooring arms 405 generally identical to the arms 205 and 206 of the decanter assembly 200, a float 408 generally identical to the float 208 of the decanter assembly 200, valve means such as a decanter valve assembly generally designated by the reference numeral 412, and a flexible discharge conduit 415 fixedly attached to a discharge flange spool assembly 416 and being identical to the discharge flange spool assembly 260 of the decanter assembly 200 and located in the wastewater treatment reactor basin 18. With the exception of the valve assembly 412, the fourth embodiment decanter assembly 400 is substantially identical to the second embodiment decanter assembly 200.

The float 408 buoyantly supports the decanter valve assembly 412, maintaining the flexible discharge conduit 415 beneath the surface of the liquid 24 in the basin 18 with the discharge flange spool assembly 416 held slightly below the surface of the liquid 24. The foam filled float 408 includes an inner cylindrical wall 419, a top surface 422 and a bottom surface 423. In order to support the decanter valve assembly 412, a generally flat, ring-shaped or annular, top mounting plate 426 rests adjacent to the top surface 422 of the float 408 and is fixedly attached by a plurality of long, headless, threaded bolts 427 that extend generally downwardly and through a generally flat, ring-shaped or annular, bottom mounting plate 428 that is adjacent to the bottom surface 423 of the float 408. The bolts 427 extend through apertures (not shown) located in the similarly-shaped plates 426 and 428 and are located near the wall 419 of the float 408. The bolts 427 are positioned generally perpendicular to both the plate 426 and the plate 428.

A plurality of nuts 431 mate with the bolts 427 near a top surface 432 of the mounting plate 426 and near a bottom surface 436 of the mounting plate 428 and thereby secure the plates 426 and 428 to the float 408 by application of torque with the nuts 431 abutting against the surface 432 and against the surface 436.

An intake manifold structure 440 is fixedly attached to the inner cylindrical wall 419 of the float 408 and extends downwardly therefrom. The intake manifold 440 is a cylindrical sleeve that has a lower portion 442 with generally rectangular segments cut out to create a plurality of intake orifices 445. Bottom edges 446 of the manifold 440 are fixedly attached to a receiving or bottom mounting flange 447 of the discharge flange spool assembly 416.

The intake manifold structure 440 slidingly sleeves a driving valve apparatus or interior driving plug 450. The interior driving plug 450 is cylindrical and has a circular sealing gasket 452 fixedly attached to the bottom surface thereof that abuts a top surface of the bottom receiving flange 447 of the discharge flange spool assembly 416 when the valve assembly 412 is in a first or closed position, as is shown in FIG. 11.

Fixedly mounted to a top surface 460 of the driving plug 450 is an actuator mounting bracket 464 that is fixedly attached to an actuator stem 466. The actuator stem 466 extends through an aperture in a cap plate assembly 468 that is fixedly mounted to a cylindrical top support sleeve 470 that is fixedly mounted to the top plate 426. The actuator stem 466 further extends into an actuator mechanism 474 that is fixedly mounted on the cap plate assembly 468. The stem 466 is operatively connected to the mechanism 474 and is forced downwardly by hydraulic or pneumatic forces from the actuator mechanism 474 to maintain the driving plug 450 in a closed position with the flange sealing gasket 452 abutting the bottom receiving flange 447.

A control line (not shown) for hydraulically or pneumatically powering the actuator mechanism 474 is mounted on the top surface of a mooring arm 405 and extends from a power source located outside the reactor basin 18 to the actuator mechanism 474 located on the float 408. The control line is situated and functions identically to the control line 295 described above with respect to the second embodiment 200.

The driving plug 450 and the actuator stem 466 are guided and held in position by the intake manifold structure 440. The structure 440 closely sleeves the plug 450, sealing the actuator stem 466 from liquid 24 in the basin 18, but allowing the plug 450 to slide vertically therewithin.

In use of the decanter assembly 400, the wastewater reactor basin 18 is filled with liquid 24 with the liquid being agitated and/or aerated as described above with respect to the decanter assembly 1 and the decanter assembly 200. During the agitation, aeration and settling steps, the valve assembly 412 is in a first or closed position with the actuator stem 466 extended, forcing the sealing gasket 452 to abut against the bottom receiving flange 447.

When it is desired to remove the clarified liquid layer from the basin 18, the driving plug 450 is raised by action of the actuation mechanism 474 to a second or open, spaced position, as is shown in FIG. 10. Pressure is relieved from the mechanism 474 and the actuator stem 466 automatically raises and enters into the mechanism 474, raising the attached plug 450. Clarified fluid then flows through the annular, bottom mounting flange 447 and the discharge flange spool assembly 416 and into the discharge conduit 415. As the fluid level lowers, the decanter assembly 400 descends, as the float 408 descends, with the mooring arms 405 swinging or pivoting in a downward direction. The valve apparatus 412 is selectively maintained open by an operator, computer control or the like, until the clarified fluid is drained to the low water level 28, after which the driving plug 450 is lowered with the gasket 452 seated against the bottom receiving flange 447, as is shown in FIG. 11.

It is to be understood that while certain forms of the present invention have been illustrated and described herein, it is not to be limited to the specific forms or arrangement of parts described and shown.

What is claimed and desired to be secured by Letters Patent is as follows:

1. A decanter assembly for removing an upper fluid layer from a wastewater treatment reservoir in a reactor basin; said assembly comprising:
    (a) float means; and
    (b) a valve assembly attached to said float means; said valve assembly including:
        (1) an actuation mechanism mounted on said float means and located above the fluid in the reservoir;
        (2) a discharge conduit connected to said float means having a liquid receiving opening surrounded by a flange; said float means maintaining said opening at a generally constant depth relative to the upper fluid level in the reservoir; and
        (3) valve means connected with said discharge conduit and selectively blocking flow of fluid from the reservoir into said discharge conduit; said valve means being connected to said actuation mechanism; said valve means including a driving valve member mating with said flange when in a closed position so as to block flow of fluid into said opening and said valve member being spaced from said opening when in an open position so as to allow flow of fluid into said opening.

2. A decanter assembly for removing an upper fluid layer from a wastewater treatment reservoir in a reactor basin; said assembly comprising:
    (a) float means; and
    (b) a valve assembly attached to said float means; said valve assembly including:
        (1) an actuation mechanism mounted on said float means and located above the fluid in the reservoir;
        (2) a discharge conduit connected to said float means having a liquid receiving opening surrounded by a flange; said float means maintaining said opening at a generally constant depth relative to the upper fluid level in the reservoir; said flange having attached thereto a first inner sleeve with at least one radially extending aperture therethrough communicating with said liquid receiving opening; and (3) valve means connected with said discharge conduit and selectively blocking flow of fluid from the reservoir into said discharge conduit; said valve means being connected to said actuation mechanism; said valve means including a second hooded sleeve slidably received over said inner sleeve; said second hooded sleeve having a sealing edge; said hooded sleeve being operably motivated by said actuation mechanism between a first closed position wherein said sealing edge seals with said flange and said hooded sleeve covers said inner sleeve aperture so as to prevent flow of fluid into said opening and a second open position wherein said hooded sleeve is spaced from said aperture so as to allow flow of fluid into said opening.

3. A decanter assembly for removing an upper fluid layer from a wastewater treatment reservoir in a reactor basin; said assembly comprising:

(a) float means; and (b) a valve assembly attached to said float means; said valve assembly including:

(1) an actuation mechanism mounted on said float means and located above the fluid in the reservoir;

(2) a discharge conduit connected to said float means having a liquid receiving opening surrounded by a flange; said float means maintaining said opening at a generally constant depth relative to the upper fluid level in the reservoir; said flange being positioned below; and (3) valve means connected with said discharge conduit and selectively blocking flow of fluid from the reservoir into said discharge conduit; said valve means being connected to said actuation mechanism; said valve means including a valve member plate having a sealing surface; said plate sealing surface mating being motivated by said actuation mechanism and mating with said flange and blocking flow into said opening then in said closed position and, further, said plate sealing surface being spaced from said flange when in an open position to allow flow of fluid into said opening.

4. A decanter assembly for removing an upper fluid layer from a wastewater treatment reservoir in a reactor basin; said assembly comprising:

(a) float means; and (b) a valve assembly attached to said float means; said valve assembly including:

(1) an actuation mechanism mounted on said float means and located above the fluid in the reservoir;

(2) a discharge conduit connected to said float means having a liquid receiving opening surrounded by a flange with a first sealing surface thereon; said float means maintaining said opening at a generally constant depth relative to the upper fluid level in the reservoir; and (3) valve means connected with said discharge conduit and selectively blocking flow of fluid from the reservoir into said discharge conduit; said valve means being connected to said actuation mechanism; said valve means including a sleeve fixedly attached to said flange and extending outwardly therefrom; said sleeve being slidably received in said float means and having at least one aperture therein flow communicating with said opening; said float means including a second sealing surface thereon; said sleeve being motivated by said actuation mechanism between a first closed position wherein said sleeve is received in said float means and said first and second sealing surfaces mate so as to prevent flow of fluid into said opening and a second open position wherein said first and second sealing surfaces are spaced and fluid is allowed to flow through said aperture into said opening.

5. The assembly according to claims 1, 2, 3 or 4 wherein said assembly includes:

(a) mooring means for connecting said float to the basin; said mooring means including a first mooring arm pivotally connected to said basin and hingedly connected to said float; said first mooring arm adapted to pivot both vertically and horizontally with respect to said basin; and (b) a second mooring arm hingedly connected to said basin and detachable therefrom; said second mooring arm being hingedly connected to said float.

6. The assembly according to claim 5 including:

(a) a power supply and control line for powering said actuation mechanism; said control line mounted on said first mooring arm.

7. The assembly according to claim 1 wherein:

(a) said valve member is generally vertically oriented and includes a plate having a generally flush exterior adapted to not collect debris from said wastewater when in the closed position thereof.

8. A decanter assembly for removing an upper fluid layer from a wastewater treatment reservoir in a reactor basin; said assembly comprising:

(a) a float having a top surface;

(b) a valve assembly fixedly mounted on said float; said valve assembly including:

(1) an actuation mechanism mounted on said top surface of said float and located above the fluid in the reservoir;

(2) a discharge conduit fixedly connected to said float and maintained a fixed distance from said actuation mechanism; said conduit having a fluid flow receiver; said float maintaining said receiver at a generally constant depth relative to the upper fluid level in the reservoir; and (3) valve means for selectively blocking flow of fluid into said discharge conduit receiver; said valve means connected to and operated by said actuation mechanism;

(c) a first mooring arm pivotally connected to said basin and hingedly attached to said float; said first mooring arm being pivotal both vertically and horizontally with respect to said basin; and (d) a second mooring arm being hingedly connected to said basin and being selectively detachable therefrom; said second mooring arm hingedly attached to said float.

9. The assembly according to claim 8 including:

(a) a power supply and control line for powering said actuation mechanism; said control line being mounted on said first mooring arm.

10. The assembly according to claim 8 wherein said valve means includes:
(a) a valve apparatus positioned over an opening into said discharge conduit received and being movable in a generally vertical orientation between a first position to allow flow of fluid into said receiver and a second position to prevent flow of fluid into said receiver; said valve apparatus operated by said actuation mechanism.

11. The assembly according to claim 10 wherein said valve apparatus includes:
(a) a plug for selectively occluding flow into said receiver.

12. The assembly according to claim 10 wherein said valve apparatus includes:
(a) a flange fixedly mounted on a distal end of said discharge conduit about said receiver and positioned to allow flow of fluid into said receiver;
(b) said flange attached to an outwardly extending cylindrical sleeve with at least one radially extending port therein; said sleeve being slidably received in a bore extending through said float;
(c) said float having a lower sealing surface adapted to mate with said flange when said valve apparatus is in said second position to prevent flow of fluid into said receiver; said flange and said sealing surface being spaced in said first position to allow flow of fluid into said receiver; and
(d) an actuator stem attached to said valve apparatus and operatively connecting said actuation mechanism to said valve apparatus.

13. The assembly according to claim 10 wherein:
(a) said valve apparatus includes a plate having a first position wherein said plate is in covering relationship to said opening and a second position wherein said plate is moved to a non-covering position to allow flow of the fluid into said opening.

14. The assembly according to claim 10 said valve means includes:
(a) a flange attached to a distal of said discharge conduit and allowing therethrough into said discharge conduit receiver;
(b) a cylindrical sleeve attached and extending outward from said flange with least one aperture therein; and
(c) a cylindrical hood slidably , over said sleeve and being operably moved by said actuator mechanism between a first position wherein said hood does not cover said aperture and allows flow of fluid into said receiver and a second position wherein said hood covers said aperture and prevents flow of fluid into said receiver.

15. The assembly according to claim 8 wherein said valve means includes:
(a) a cylindrical sleeve having a sealing flange; said sealing flange sealingly seating upon a lower mating surface of said float when in a closed position thereof.

16. The assembly according to claim 8 including:
(a) a discharge manifold structure fixedly attached to said float and flow connected to said discharge conduit; and wherein:
(b) said valve means include an interior driving plug positioned on and being slidable with respect to said discharge manifold structure.

17. A decanter assembly for removing an upper fluid layer from a wastewater treatment reservoir in a reactor basin; said assembly comprising:
(a) a float having a top surface;
(b) a valve assembly fixedly mounted to said float; said valve assembly including:
(1) an actuation mechanism mounted on said top surface of said float and adapted to be located above the fluid in the reservoir;
(2) a discharge conduit having an opening defining a liquid receiver that is connected to said float in spaced relation thereto and maintained a fixed distance from said actuation mechanism; said float maintaining said receiver at a generally constant depth relative to the upper fluid level in the reservoir; and
(3) valve means for selectively blocking flow of fluid into said discharge conduit receiver; said valve means connected to and operably actuated by said actuation mechanism; said valve means including:
(i) a generally vertically oriented valve apparatus that is slidable with respect to said receiver between a first closed position wherein said apparatus blocks flow of fluid into said receiver and a second open position wherein said apparatus allows flow of fluid into said receiver;
(c) a first mooring arm pivotally connected to said basin and hingedly connected to said float; said first mooring arm being pivotal both vertically and horizontally with respect to said basin; and
(d) a second mooring arm hingedly connected to said basin and being selectively detachable therefrom; said second mooring arm being hingedly connected to said float.

18. A decanter assembly for removing an upper fluid layer from a wastewater treatment reservoir in a reactor basin; said assembly comprising:
(a) a float having a top surface;
(b) a valve assembly fixedly mounted to said float; said valve assembly including:
(1) an actuation mechanism mounted on said top surface of said float and adapted to be located above the fluid in the reservoir;
(2) a discharge conduit having an opening defining a liquid receiver that is connected to said float in spaced relation thereto and maintained a fixed distance from said actuation mechanism; said float maintaining said receiver at a generally constant depth relative to the upper fluid level in the reservoir; and
(3) valve means for selectively blocking flow of fluid into said discharge conduit receiver; said valve means connected to and operably actuated by said actuation mechanism; said valve means including:
(i) a receiving flange fixedly mounted on said discharge conduit so as to surround said receiver and be flow connected thereto;
(ii) a discharge manifold structure fixedly attached to said float and flow connected to said discharge conduit;
(iii) an exterior hood slidingly sleeved with respect to said discharge manifold structure; said hood having a first and a second position wherein when said hood is in said first position, said hood sealably mates with said receiving flange to prevent flow of fluid into said receiver and when said hood is in said second position, said hood is spaced from said receiving flange to allow flow of fluid into said discharge conduit;
(c) an actuator stem fixedly attached to said valve hood and operatively connected to said actuation mechanism;
(d) a first mooring arm pivotally connected to said basin and hingedly connected to said float; said first mooring arm being pivotal both vertically and horizontally with respect to said basin; and
(e) a second mooring arm hingedly connected to said basin and detachable therefrom; said second mooring arm being hingedly connected to said float.

19. A decanter assembly for removing an fluid layer from a wastewater treatment reservoir in a reactor basin; said assembly comprising:
(a) a float having a top surface;
(b) a valve assembly fixedly mounted to said float; said valve assembly including:
   (1) an actuation mechanism mounted on said top surface of said float and adapted to be located above the fluid in the reservoir;
   (2) a discharge conduit having an opening defining a liquid receiver that is connected to said float in spaced relation thereto and maintained a fixed distance from said actuation mechanism; said float maintaining said receiver at a generally constant depth relative to the upper fluid level in the reservoir; and
   (3) valve means for selectively blocking flow of fluid to said discharge conduit receiver; said valve means connected to and operably actuated by said actuation mechanism; said valve means including:
      (i) a receiving flange fixedly mounted relative to said discharge conduit and allowing fluid flow into said receiver;
      (ii) a driving plug having a sealing flange fixedly attached thereto; said driving plug slidingly mounted within said valve means; said driving plug having a first and a second position such that when said plug is in said first position, said plug sealably mates said sealing flange with said receiving flange to prevent flow of fluid into said receiver and when in said second position, said plug and said sealing flange are spaced from said receiving flange so as to be adapted to allow flow of fluid into said discharge conduit receiver;
(c) an actuator stem fixedly connected to said driving plug and operatively connected to said actuation mechanism;
(d) a first mooring arm pivotally connected to said basin and hingedly connected to said float; said first mooring arm being pivotal both vertically and horizontally with respect to said basin; and
(e) a second mooring arm hingedly connected to said basin and detachable therefrom; said second mooring arm being hingedly connected to said float.

20. A decanter assembly for removing an upper fluid layer from a wastewater treatment reservoir in a reactor basin; said assembly comprising:
(a) a float having a top surface;
(b) a valve assembly fixedly mounted to said float; said valve assembly including:
   (1) an actuation mechanism mounted on said top surface of said float and located above the fluid in the reservoir;
   (2) a discharge conduit having an opening defining a liquid receiver that is connected to said float in spaced relation thereto and maintained a fixed distance from said actuation mechanism; said float maintaining said receiver at a generally constant depth relative to the upper fluid level in the reservoir; and
   (3) valve means for selectively blocking flow of fluid into said discharge conduit receiver; said valve means connected to and operably actuated by said actuation mechanism; said valve means including:
      (i) a receiving flange fixedly mounted relative to said discharge conduit and adapted to allow flow of fluid into said receiver;
      (ii) a discharge manifold structure fixedly attached to said float and flow connected to said discharge conduit;
      (iii) an interior driving plug slidingly mounted within said discharge manifold and sleeved thereby; said driving plug having a first and second position such that when said plug is in said first position, said plug sealably mates with said receiving flange and when said plug is in said second position, said plug is spaced from said receiving flange so as to be adapted to allow fluid flow into said receiver;
(c) an actuator stem fixedly connected to said driving plug and operatively connected to said actuation mechanism;
(d) a first mooring arm pivotally connected to said basin and hingedly connected to said float; said first mooring arm being pivotal both vertically and horizontally with respect to said basin; and
(e) a second mooring arm hingedly connected to said basin and detachable therefrom; said second mooring arm being hingedly connected to said float.

* * * * *